Feb. 1, 1944. J. D'A. CLARK 2,340,733
APPARATUS FOR DETERMINING THE BURSTING STRENGTH OF SHEET MATERIAL
Filed April 2, 1942 2 Sheets-Sheet 1
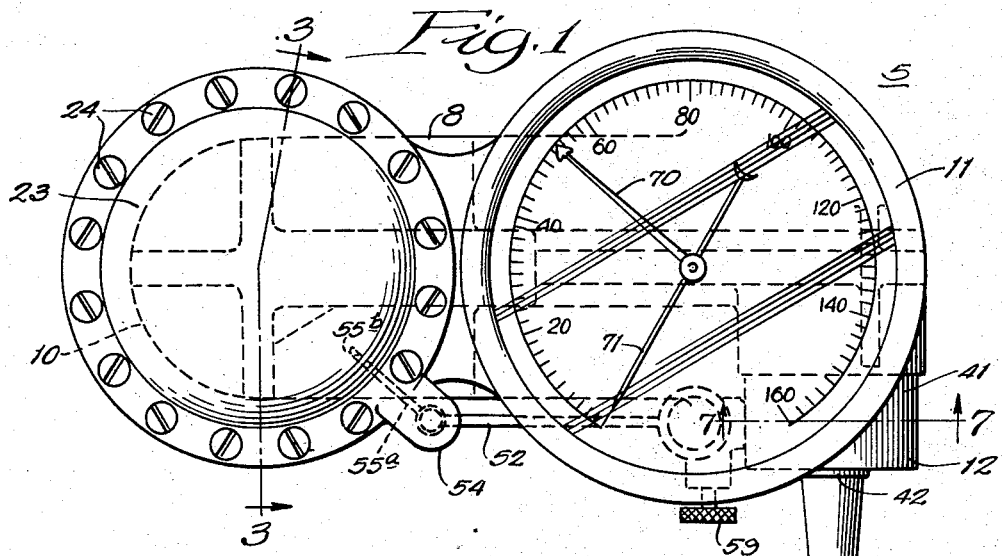
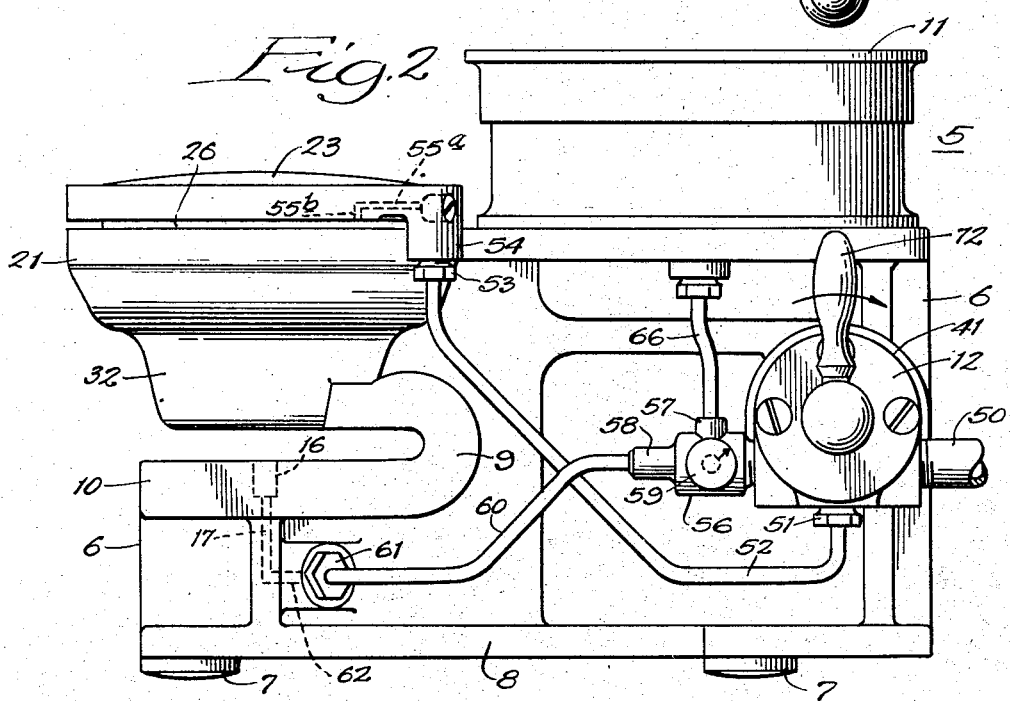
Inventor:
James d'A. Clark,
By Soans, Pond & Anderson
Attorneys.

Feb. 1, 1944.   J. D'A. CLARK   2,340,733
APPARATUS FOR DETERMINING THE BURSTING STRENGTH OF SHEET MATERIAL
Filed April 2, 1942   2 Sheets-Sheet 2
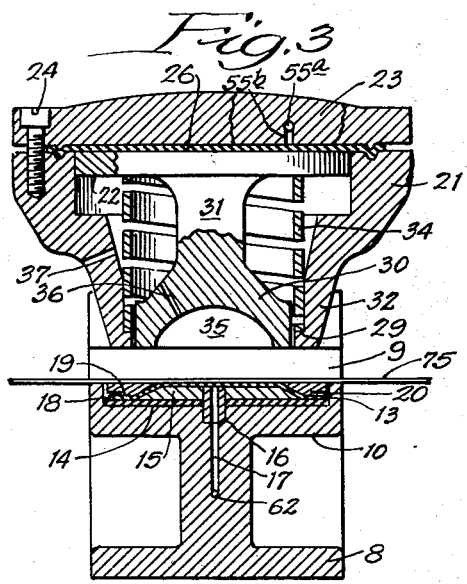
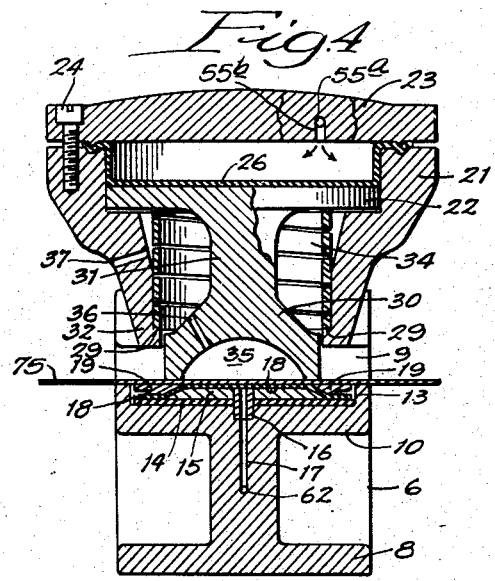
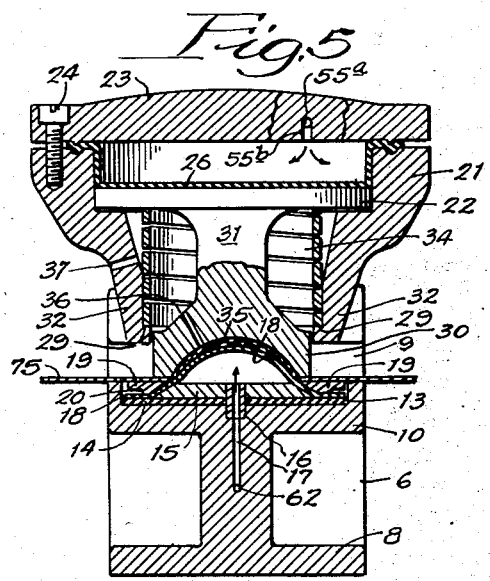
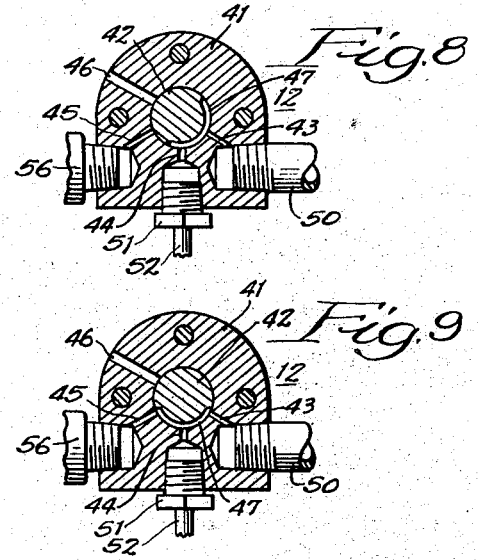
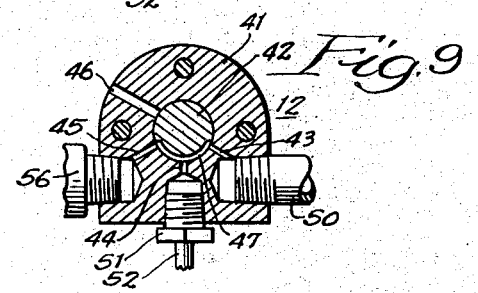
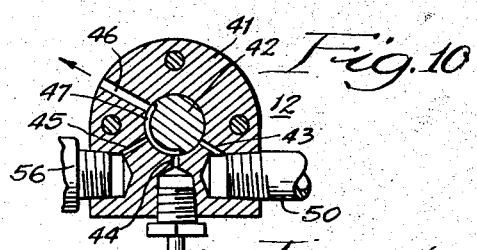
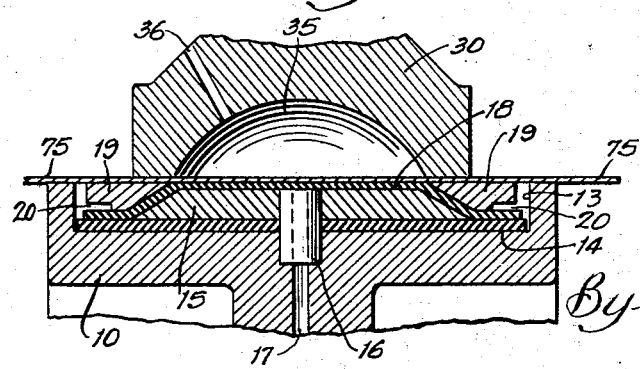
Inventor:
James d'A. Clark,
By Soans, Pond & Anderson
Attorneys.

Patented Feb. 1, 1944

2,340,733

UNITED STATES PATENT OFFICE 2,340,733

APPARATUS FOR DETERMINING THE BURSTING STRENGTH OF SHEET MATERIAL

James d'A. Clark, Appleton, Wis., assignor to The Institute of Paper Chemistry, a corporation of Wisconsin Application April 2, 1942, Serial No. 437,354

2 Claims. (Cl. 265—14)

The present invention is directed to improvements in apparatus for testing the bursting strength of paper and like material.

One of the specifications on which paper is sold is its so-called "bursting strength." In determining this property, samples from a lot of paper are placed in suitable testing apparatus, such as the Mullen or Schopper-Dalen machine, one at a time, and the pressure which a certain area of each sample will withstand before bursting is measured. Because of the importance of these tests as a measure of the strength of paper, very serious efforts have been made by TAPPI and like organizations to develop standard testing procedures and apparatus which will give truly comparative and readily reproducible results. Some progress has been made, but with the apparatus and procedures at present available, the results obtained are subject to considerable variation and are generally incapable of reproduction on different machines, or sometimes even on the same machine with different operators. It appears that some of these difficulties result either from inherent characteristics of the particular apparatus used or from the condition of the apparatus at the time of the test. In addition procedural differences, even if slight, resulting from operation of the machine by different operators are sufficient to affect the precision of the results obtained materially. In brief, bursting strength tests on known apparatus and by known procedures are not only lacking in precision, but in addition are incapable of reproduction.

As a result, there is a great need in the paper making industry for an improved testing apparatus and procedure for use in determining the brusting strength of paper, and particularly is there a need for a testing apparatus and procedure which will give more precise and more readily reproducible results than the available apparatus and procedures. The supplying of this need is the primary object of the present invention. As will hereinafter appear, this object is accomplished by the provision of bursting strength tesfing apparatus which is substantially completely automatic in operation, being controlled by the operation of a single valve, and by the provision of other novel features which will be described.

For a more complete understanding of the nature and scope of my invention, reference may be had to the following detailed description thereof taken in connection with the accompanying drawings in which:

Fig. 1 is a top plan view of apparatus embodying the present invention for testing the bursting strength of paper;

Fig. 2 is a front elevational view of the testing apparatus shown in Fig. 1;

Fig. 3 is a vertical sectional view taken generally on line 3—3 of Fig. 1, certain parts being broken away, and showing the initial positions of the movable parts of the testing apparatus when ready to have a paper sample tested therein;

Fig. 4 is a view similar to Fig. 3 showing the positions of the parts of the testing apparatus when the sample of paper is clamped therein;

Fig. 5 is a view similar to Fig. 4 illustrating the manner in which the paper sample is finally burst when tested for bursting strength in the apparatus;

Fig. 6 is an enlarged fragmentary view showing certain of the details of the sample holding means constituting a part of the apparatus;

Fig. 7 is a vertical sectional view taken on line 6—6 of Fig. 1 through a four-way control valve for the testing apparatus of Figs. 1 and 2 with the operating member of the valve being in the neutral position;

Fig. 8 is a sectional view through the control valve similar to Fig. 7, but with the valve operating member advanced to the position whereby the testing apparatus is operated to the clamping position shown in Fig. 4;

Fig. 9 is a vertical sectional view through the control valve similar to Fig. 7, but showing the valve operating member in a still further advanced position so as to operate the tester to the stage of operation illustrated in Fig. 5; and Fig. 10 is a vertical sectional view through the control valve similar to Fig. 7, and showing the operating member of the valve in its final position whereby the parts of testing apparatus are permitted to resume their initial positions shown in Fig. 3.

Referring particularly to the first three figures of the drawings, the testing apparatus of my invention is indicated generally at 5 and comprises a rigid, cast metal, main frame 6 on which the various parts of the apparatus are mounted. The base 8 of the frame is generally rectangular in outline, about 3 inches wide, 5 inches high, and 9 inches long. Rubber feet 7 or the like are provided on the underside of the base portion 8 so that the apparatus may be conveniently supported on a table or bench. The left hand portion of the frame 6 includes an open, rigid, yoke 9 having a flat, horizontal portion 10 which serves as a platen for holding the sample being tested. The right hand portion of the apparatus includes a pressure gauge 11 and a control valve 12. Suitable piping interconnects the different parts of the apparatus as will appear hereinafter.

The platen portion 10 of the frame 6 is provided with a circular recess 13 formed in the face thereof, and a circular rubber gasket 14 is placed in this recess. A disc member 15 having the form of a truncated cone overlies the gasket 14. The disc 15 is of less diameter than the recess 13, and is held centrally thereof by means of a small spool 16 which extends through the central portion of the disc 15 and the underlying gasket 14 into a suitable counterbored passageway 17.

A flexible rubber diaphragm 18 which is circular in outline overlies the disc 15. This diaphragm is preferably of thin, pure rubber sheeting, not over about .005 inches thick, "dental dam" rubber sheeting being particularly satisfactory for the purpose. The flexible diaphragm 18 is of substantially the same diameter as the recess 13, and hence extends beyond the lower diameter of the disc 15, as shown. The diaphragm 18 is held in place during the operation of the machine by an annular clamping or sealing ring 19 which is disposed thereon.

The underside of the inner circular edge of the clamping ring 19 is beveled at an angle corresponding to the angle of the truncated edge portion of the centrally located disc member 15. The thickness of the clamping ring 19 is such that the upper surface thereof is substantially in the same plane as the upper surface of the rubber diaphragm 18 when the assembly is placed under pressure during the operation of the apparatus. The clearance between the opposed beveled surfaces of the disc 15 and the clamping ring 19 should be sufficient to leave the diaphragm 18 free in this conical area. This prevents marking of the sample during the clamping operation. The outer edge of the under surface of the clamping ring 19 is undercut as shown at 20 in Fig. 6 to aid in securing a tight clamping pressure on the outer edge of the diaphragm 18.

The section of the main frame 6 directly above the platen portion 12 serves as the housing for the operating parts of the automatically operated sample holding means. The upper part of this housing comprises a short cylinder 21 in which there is disposed a relatively thin, large diameter, loosely fitting piston 22. The upper end of the cylinder 21 is closed by a cylinder head 23 secured thereto by a number of spaced cap screws 24, as shown. A flexible, rubber diaphragm 26 of heavier material than the diaphragm 18 is secured between the cylinder 21 and the cylinder head 23. During the operation of the apparatus pressure air is admitted to the upper side of the diaphragm 18 to force down the piston 22. The diaphragm 26 fits just inside of the row of cap screws 24.

A cylindrical clamping head 30 which cooperates with the platen assembly to hold the sample being tested during the operation of the apparatus is carried on the underside of the piston 22 by an integral interconnecting shank 31. In order to guide the clamping head 30 into proper engagement with platen assembly, the cylinder 21 includes a cylindrical skirt or guide portion 32 which loosely engages the sides of the head 30. An annular shoulder 29 is provided in the lower end of the guide portion 32 for retaining the lower end of a compression spring 34, as shown.

The compression spring 34 is compressed between the shoulder 29 and the underside of the piston 22 so as to normally force or bias the piston 22 upwards against the closed end of the cylinder 21. The clamping head 30 is thereby held in its upper retracted position as shown in Fig. 3.

The face of the clamping head 30 is annular in outline and is provided with a central recess 35 into which the rubber diaphragm 18 is adapted to burst each paper sample, as will appear hereinafter. The clamping head 30 is provided with a vent 36, and the skirt or guide portion 32 is provided with a cooperating vent 37 designed to obviate the building up of pressures within the cylinder 21. It will be seen that by virtue of the construction of the parts above mentioned the clamping head 30 is free to float axially to a limited extent, if necessary, so as to secure perfect alignment of the face of the clamping head 30 and the face of the clamping or sealing ring 19 when a sample of paper is placed therebetween.

The apparatus is adapted to be completely controlled by the operation of the single valve 12 which is located on the right-hand side of the frame 6, as shown in Figs. 1 and 2. The valve 12 consists of a stationary outer part 41 and a movable, inner operating member 42 (Fig. 7), and is of the four-way type, the outer valve part 41 being provided with four ports 43, 44, 45 and 46 leading into the interior of the valve. As shown in Fig. 7, the valve ports 43, 44, 45 and 46 are each spaced about 45 angular degrees apart, although it will be understood that this particular arrangement is not essential. The operating member 42 is provided with an arcuate groove 47 in the side thereof for the purpose of interconnecting the valve ports 43, 44, 45 and 46 in a plurality of different combinations as will be explained hereinafter in connection with Figs. 7 through 10 of the drawings.

The valve body 41 is drilled out in three places so as to provide for the connection of pipes with the three valve ports 43, 44 and 45. The fourth valve port 46 opens directly to the atmosphere, and no pipe connection is made thereto. A pipe line 50 connects the valve port opening 43 with a source of fluid pressure, preferably compressed air. A plug fitting 51 screwed into the underside of the valve 12 connects a pipe line 52 into the valve port 44. The other end of the line 52 (Fig. 2) is connected by a similar plug fitting 53 into a pressure inlet 54 integrally formed on the side of the cylinder head 23. The cylinder head 23 is provided with small passageways 55a and 55b (Figs. 2 and 3) which connect the pressure inlet 54 to the top of the rubber diaphragm 26.

The inlet side of a needle valve 56 is threaded into the left hand side of the control valve 12 so as to communicate with the valve port 45. The needle valve 56 is provided with the usual adjusting screw 59 and has two outlet connections 57 and 58. The outlet opening 58 is interconnected in pressure conductive relationship with the underside of the sample bursting diaphragm 18 by a conduit or line 60, one end of which is connected into the outlet 58, and a plug fitting 61. The frame 6 is provided with a small passageway 62 (Fig. 3) which connects the inlet fitting 61 through the passageway 17 and the spool 16 to the underside of the sample bursting diaphragm 18.

The other outlet 57 of the needle valve 56 is connected to the pressure gauge 11 by a pipe line 66 as shown in Fig. 2. The same fluid pressure will be transmitted from the control valve 10 through the needle valve 56 to each of the outlets 57 and 58 and therefore, the pressure conducted through the line 60 to the underside of the sample bursting diaphragm 18 will be the same as that conducted through the line 66 to the gauge 11. As shown in Fig. 1, the pressure gauge 11 is provided with a resettable "maximum" hand 70 adapted to be moved around the gauge dial by the needle 71.

The operation of the apparatus in determining the bursting strength of paper samples is as follows: At the beginning of each test the valve operating handle 72 which is mechanically connected to the operating member 42 should be in a substantially vertical position. With the handle in this position the valve operating member 42 will be in the position shown in Fig. 7, the valve port 43 through which compressed air is applied to the valve 12 communicating only with the arcuate groove 47. The movable parts of the apparatus will be in their initial positions shown in Fig. 3, the compression spring 34 holding the piston 22 against the cylinder head 23 so that the clamping head 30 is in its elevated or retracted position over the platen 12. A sample piece of paper 75 to be tested is now placed on the top of the sample bursting diaphragm 18 forming a part of the platen assembly as shown in Fig. 3.

Next the valve handle 72 is turned about 45° in a clockwise direction so that the valve operating member 42 will be turned to the position shown in Fig. 8. This moves the arcuate groove 47 to effect interconnection of the valve ports 43 and 44. Thereupon pressure will be transmitted from the supply line 50 through the valve 10 and the line 52 to the top of the rubber diaphragm 26. The fluid pressure acting on the top of the diaphragm 26 expands that member as to force the piston 22 and clamping head 30 downwardly as shown in Fig. 4. By this movement of the piston 22 against the resistance of the spring 34, the clamping head 30 is forced against the diaphragm clamping ring 19 and the other parts of the platen assembly so as to hold the paper sample 75 and the sample bursting diaphragm 18 therebetween. The force applied to the clamping head 30 should be sufficient so that the diaphragm 18 is held in fluid tight relationship against the bed of the platen 10.

The next movement in the operation of the apparatus is to turn the operating handle 72 about 45° further in a clockwise direction so as to bring the valve operating member 42 to the position shown in Fig. 9. In this position the arcuate groove 47 interconnects the three valve ports 43, 44, and 45. Fluid pressure continues to be transmitted to the upper side of the rubber diaphragm 26 in the cylinder 21 so as to hold the clamping head 30 in the sample holding position with a fixed, predetermined pressure. At the same time fluid pressure is also transmitted through the valve port 45 into the inlet side of the needle valve 56. From the needle valve 56 the pressure will be transmitted through the line 60 to the underside of the sample bursting diaphragm 18. As a result, the diaphragm 18 will be caused to expand into the recess 35 in the clamping head 30 against the restraint of the paper sample 75 which is clamped between the clamping head 30 and the platen assembly. The needle valve 56 is adjusted so that the pressure is supplied gradually to the underside of the diaphragm 18 so as to be closely followed by the needles 70 and 71 of the pressure gauge 11. Finally, the pressure under the rubber diaphragm 18 will reach a value where the paper sample 75 is burst into the recess 35 as indicated in Fig. 5. Thereupon the pressure beneath the diaphragm 18 momentarily drops because the rubber diaphragm 18 will now further expand. The diaphragm 18 is restrained from bursting by the walls of the recess 35. The maximum pressure attained will be indicated on the pressure gauge 11 by the maximum hand 70.

Immediately after the bursting of the paper sample 75 occurs, the valve handle 72 is turned 45° further in a clockwise direction so as to bring the arcuate groove 47 in the operating member 42 to the position shown in Fig. 10. The valve handle 72 must be advanced to the Fig. 10 position before the pressure beneath the now expanded diaphragm 18 builds up to that previously required to burst the paper, or the gauge will register an erroneous maximum. With a normal setting of needle valve 56, adequate time is available for this motion. In the Fig. 10 position, the three valve ports 44, 45 and 46 are interconnected and the compressed air port 43 is disconnected from those three ports. Accordingly, the pressure in the upper side of the diaphragm 26 will be released and the compression spring 34 will retract the piston 22 and diaphragm 26 upwardly against the cylinder head 23 as shown in Fig. 3. The pressure air is released from the cylinder 21 through the line 52 and out through the discharge port 46. With the clamping head 30 withdrawn, most of the pressure underneath the rubber diaphragm 18 is released by leakage directly from the underside thereof around the edges of the circular recess in the platen 10. As explained above, the diaphragm clamping ring 19 fits fairly loosely in the platen 12 and thereby permits free release of the pressure under the sample bursting diaphragm 18 when the clamping head 30 is raised. A small portion of the fluid pressure under the diaphragm 18 may leak back through the line 60 and needle valve 56 and out through the valve port 46.

The valve 12 may be provided with a fifth port through which pressure can be supplied for retracting the piston 22 during the cycle of operation. The piston may also be inverted so that its own weight will serve to retract it.

The reading indicated by the hand 70 is recorded as the bursting strength of the sample 75 and the hand 70 is then reset to zero position. The burst paper sample 75 is removed from the apparatus and another sample is inserted in place on the platen assembly and diaphragm 18 and the above operations are repeated. It will be seen that the valve control handle 72 may be turned in a clockwise direction directly from the position thereof corresponding to Fig. 10 to the position corresponding to Fig. 8 without stopping at the intermediate position corresponding to Fig. 7.

From the foregoing description, it will be seen that paper samples may be tested for their bursting strength in the apparatus solely by the operation of the valve 12. The operation of the apparatus is substantially completely automatic and this results in considerable saving of time, as compared with prior procedures. Furthermore, the rate of loading on the underside of the paper sample 75 may be readily controlled to that desired or as specified for any testing procedure by adjusting the opening in the needle valve 56. By using air as an operating medium a substantially uniform rate of increase of bursting pressure is obtained in contrast to liquid operated testers commonly in use wherein a uniform volume of liquid per second is pumped to the underside of the sample bursting diaphragm 18. In such liquid operated testers the rate of loading is low at the beginning then rapidly accelerates until when the specimen is burst the rate is usually so great that the inertia of the moving parts in the maximum hand pressure gauge 11 carries the indicating needle an uncertain and uncontrollable distance beyond the true maximum bursting pressure. Because the sample bursting diaphragm 18 is so clamped in position that its upper surface is wholly in contact with the specimen to be tested, in contrast to other bursting strength testers heretofore described wherein the sample bursting diaphragm is clamped on a plane substantially beneath that of the plane of the specimen, no "diaphragm error" is introduced in the reading. "Diaphragm error" is present in certain of such prior apparatus because of the uncertain pressure required to extend the sample bursting diaphragm so as to contact the underside of the specimen uniformly and before a stress is applied to the specimen.

Since it is obvious that the principles of my invention may be embodied into different modifications of paper testers, it is intended that all matter described above or shown in the accompanying drawings shall be interpreted as illustrative and not in a limiting sense.

I claim:

1. In apparatus for determining the bursting strength of sheet materials, in combination, a rigid platen means for supporting a sheet of the material to be tested, said platen means having a flat upper surface and a recess formed in said surface, an extensible diaphragm, means including a flat disc and an annular clamping ring for supporting said diaphragm within said recess, the relative dimensions of said recess and said diaphragm supporting means being such that said diaphragm is normally disposed substantially coplanar with the flat surface of said platen means, a clamping head movable into and out of engagement with said platen means, means including a piston for moving said clamping head into engagement with said platen means with predetermined pressure so as to hold the material being tested in surface contact with said diaphragm, a recess in the face of said clamping head into which the material being tested and said diaphragm may be forced during test, a source of fluid pressure, meangs including piping and a control valve having four positions for connecting said source of fluid pressure to said piston and to said diaphragm for effecting the operation of said apparatus, said means being operable when said valve is in the first position to cause said clamping head to be held out of engagement with said platen, being operable when said valve is in the second position to move said piston and clamping head into engagement with said platen and said diaphragm support means, being operable when said valve is in the third position to apply pressure to the side of said diaphragm which is opposite said clamping head to accomplish the bursting of the material being tested, and operable when said valve is in the fourth position to disconnect said source of fluid pressure and relieve the pressure previously applied to said piston and diaphragm, and means for indicating the pressure which is applied to said diaphragm during the operation of said apparatus.

2. In apparatus for determining the bursting strength of sheet materials, in combination, a rigid platen means for supporting a sheet of the material to be tested, said platen means having a flat upper surface and a recess formed in said surface, an extensible diaphragm, means including a flat disc and an annular clamping ring having opposed cooperating surfaces for engaging said diaphragm and for supporting said diaphragm within said recess, the relative dimensions of said recess and said diaphragm supporting means being such that said diaphragm is normally disposed substantially coplanar with the surface of said platen means, a clamping head movable into and out of engagement with said platen means, a spring normally biasing said clamping head out of engagement with said platen means, means including a piston for moving said clamping head into engagement with said platen means with predetermined pressure so as to hold the material being tested in surface contact with said diaphragm, a recess in the face of said clamping head into which the material being tested and said diaphragm may be forced during test, a source of fluid pressure, means including piping and a control valve having four positions for connecting said source of fluid pressure to said piston and to said diaphragm for effecting the operation of said apparatus, said means being operable when said valve is in the first position to disconnect said source of fluid pressure from said apparatus, being operable when said valve is in the second position to admit fluid pressure to said piston and thereby to cause said piston to move said clamping head into engagement with said platen and said diaphragm support means against the force of said biasing spring, being operable when said valve is in the third position to apply pressure at a predetermined, controllable, uniform rate to the side of said diaphragm which is opposite said clamping head to accomplish the bursting of the material being tested, and operable when said valve is in the fourth position to disconnect said source of fluid pressure from said apparatus and to relieve the pressure previously applied to said piston and diaphragm, and means for indicating and recording the pressure which is applied to said diaphragm during the operation of said apparatus.

JAMES d'A. CLARK.